Patented Oct. 15, 1940

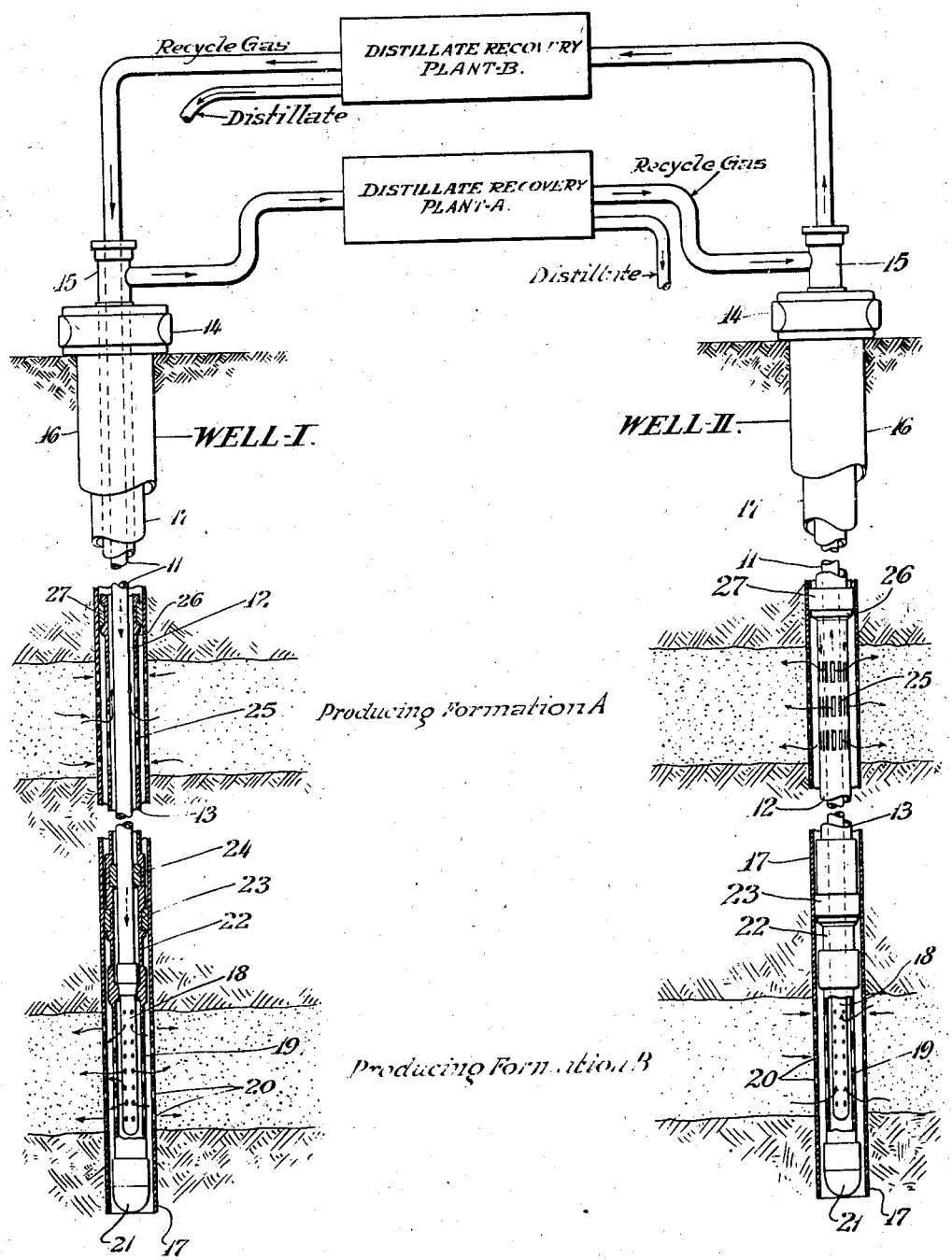

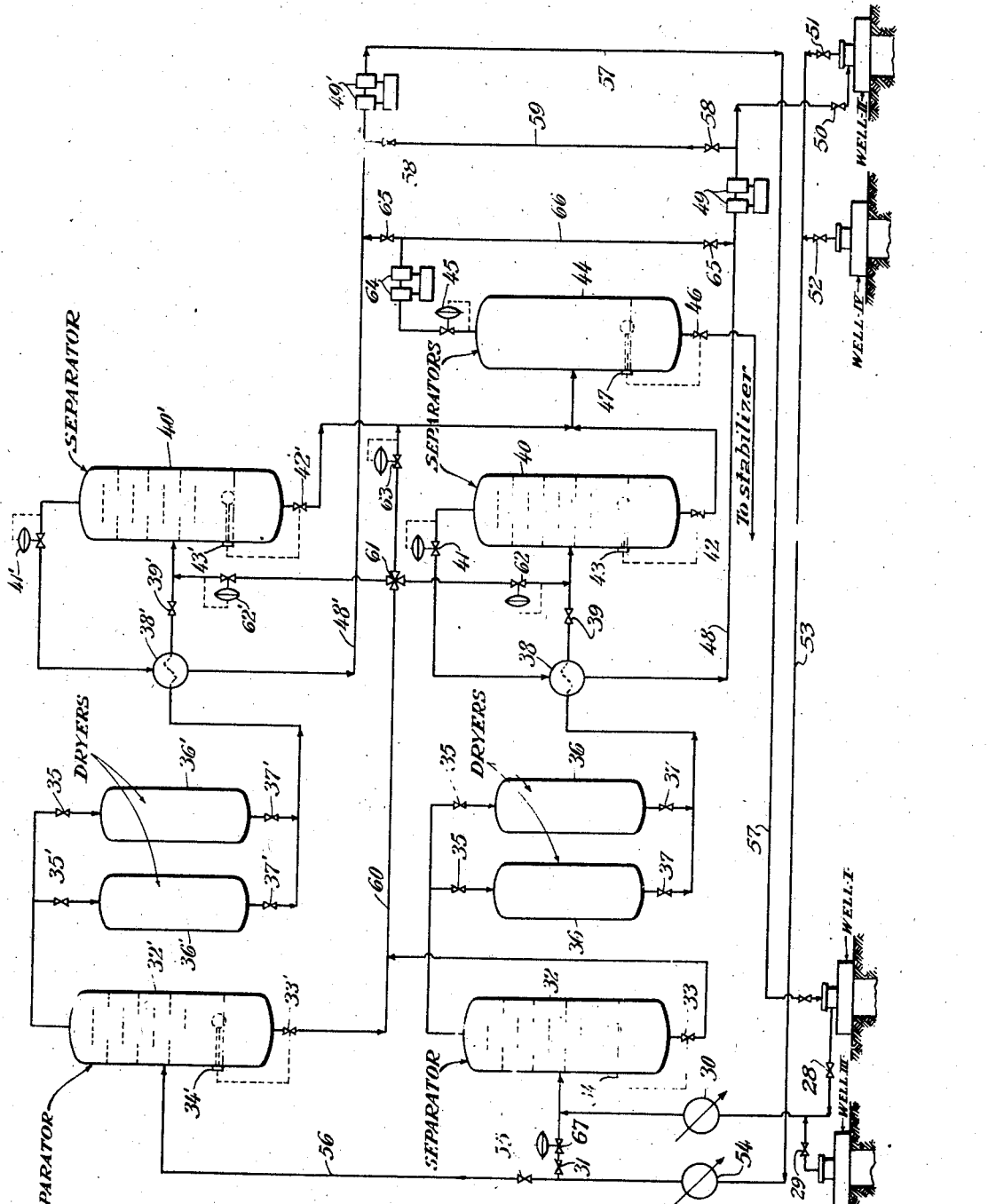

2,217,749

UNITED STATES PATENT OFFICE 2,217,749

LIQUID RECOVERY AND GAS RECYCLE METHOD

Earl V. Hewitt, Houston, Tex., assignor to Pan American Production Company, Houston, Tex., a corporation of Delaware Application January 26, 1939, Serial No. 252,933

6 Claims. (Cl. 166—21)

This invention relates to a method of producing well fluids from at least two separate productive formations in the same field, recovering liquid hydrocarbons from these well fluids and recycling at least a major part of the gas to the two formations.

As drilling operations reach deeper and deeper producing formations the situation is being encountered with increasing frequency that the well fluids are wholly or largely in a single phase in the formation but contain valuable liquid hydrocarbons referred to as distillate which can be recovered by various methods including absorption processes and the use of the retrograde condensation effect. After recovery of the distillate a large amount of gases principally methane and ethane, remains which cannot in most instances be utilized efficiently above ground and it is, therefore, important as a conservation measure to reinject these gases into the formation. Moreover, not only is this necessary in order to prevent waste of the gas but reinjecting the gas into the formation under high pressures greatly increases the ultimate recovery of valuable liquid hydrocarbons.

Methods and apparatus now known can be used effectively to recover these distillate hydrocarbons and reinject the gases into the formation from which they came but no entirely satisfactory technique has been developed for the handling of situations involving two or more formations located at different depths and having different formation pressures. My invention is specifically directed to this latter problem.

It is an object of my invention to provide an efficient and economical method for the recovery of liquids from and the reinjection of gases into two producing formations in the same field. Another object of my invention is to accomplish this by the use of a minimum number of wells. A further object of my invention is to produce from distillate wells in such manner as to prevent the premature formation of liquid hydrocarbons within the wells with consequent slugging. A still further object of my invention is to provide a gas recycling system of improved economy and improved flexibility. Another object of my invention is to provide a gas recycle system in which the input wells serve also as producing wells. Yet another object of my invention is to provide a system of the type described in which liquid hydrocarbons recovered from two different formations at different pressures can be handled in a single system. Other and more detailed objects, advantages and uses of my invention will become apparent as the description thereof proceeds.

In gas recycle systems it is customary to use a number of producing wells for each injection well, for instance five producing wells and one input well can be used. The input well has in the past been drilled and equipped for this specific purpose and has no value as a producing well. Since for both practical and legal reasons it is impossible to produce from two different formations with the same well, it has been necessary where two producing formations were concerned to utilize twice as many wells as for one formation, for instance a total of twelve wells instead of six as mentioned above for one formation. On the other hand, in accordance with my invention, only ten wells would be required to do this same work—five producing from one formatson and five from the other—while any desired number of these ten producing wells would also serve as input or injection wells. Thus one of them could be used for injection into one formation and another for injection into the other formation and improved flexibility would result since any desired producing well could be used also as an input well.

My invention will now be described in more detail with particular reference to the accompanying drawings in which:

Figure 1 is a diagrammatic elevation, partly in section, showing two wells equipped in accordance with my invention; and Figure 2 is a flow diagram of one type of distillate recovery apparatus which can be used in accordance with my invention:

It will be seen that well I produces from formation A and at the same time injects gas into formation B. On the other hand, well II produces from formation B and injects gas into formation A. This is accomplished by means of two tubings which are preferably, but not necessarily, concentric. In the case of well I the recycle gas passes down through the insert tubing II while the well fluids produced from formation A pass up through the annular space 12 between the insert tubing II and the outside tubing 13. In the case of well II the opposite situation is illustrated; namely, the fluids produced from formation B pass up through the insert tubing II while the gases reinjected into formation A pass out through the annular space 12 between the insert tubing II and the outside tubing 13. In either case, of course, the fluid going to or from the upper formation is carried through the annular space between the two tubings while that going to or coming from the lower formation passes through the insert tubing.

Figure 1 illustrates for purposes of simplicity only two wells but it will be apparent form the previous description and from general considerations familiar to those skilled in the art that an actual field set-up will usually include additional wells, particularly additional producing wells. One advantage of my invention lies in its flexibility since any of these various producing wells can be utilized also as input wells if suitably equipped in accordance with my invention. Thus, if channeling should occur between the input well and the producing wells resulting in the recovery of a lean gas from the producing well, nothing can be done about it in the ordinary case since the producing wells cannot be equipped for injection and royalty owners will not permit the conversion of a producing well to an injection well. However, when the scheme of my invention is used any of the producing wells can be converted into an input well without interfering with its function as a producing well and thus very great flexibility is obtained.

Fluids from producing well I pass to distillate recovery plant A and the recycled gas from this distillate recovery plant goes back to producing formation A through well II. Similarly the fluids from producing formation B go to distillate recovery plant B and the recycled gas from this plant goes to producing formation B as shown in Figure 1. However, it will be apparent that the two gases can be combined and a portion of them sent to each formation and it is also possible to inject gas from formation A into producing formation B and vice versa.

The well equipment shown in Figure 1 is diagrammatic and omits details which can readily be provided by those skilled in the art. Briefly it will be seen in the case of each of the two wells that there is a casinghead 14 above which is a Christmas tree 15 shown in greatly simplified form. Below the casinghead is the surface casing 16 and within it is the oil string of casing 17. Within this in turn is the outside tubing 13 and inside of this string of tubing is the insert tubing 11. The insert tubing terminates in a perforated nipple 18 and communication between this insert tubing and producing formation B is provided by means of screen 19 at the bottom of the outside tubing 13 and perforations 20 in casing 17 opposite producing formation B. Below screen 19 at the bottom of the outside tubing is set shoe 21 and above it is blank liner 22. The space between the liner and the casing is sealed by means of liner packer 23 and the annular space 12 between the outside tubing and the insert tubing is sealed by packer 24. There is thus no communication between the two producing formations.

Opposite formation A outside tubing 13 carries a screen 25 and the casing is perforated at this point so that communication between producing formation A and the annular space between the two tubings is established. Above the screen 25 is blank liner 26 carrying a liner packer 27.

Turning now to Figure 2, it will be seen that the fluids from formation A pass to a distillate recovery plant. These fluids come not only from well I shown in Figure 1 but also from other wells exemplified by well III. These fluids pass out of the wells through control valves 28 and 29 and thence through cooler 30 where a preliminary amount of distillate is liquefied by virtue of the lowered temperature. Valve 31 being closed the fluids then pass to separator 32 from which distillate is withdrawn through valve 33, controlled by liquid level controller 34, and disposed of as will later be described. The gases from this separator pass through one or both of valves 35 to one or both of driers 36 and then out through one or both of valves 37. These driers can be filled with a solid drying agent, for instance calcium chloride, and can be refilled at suitable intervals or regenerated by the passage of hot gases therethrough. The purpose of drying the gas at this point is to prevent hydrate formation when the temperature and pressure are later reduced to points at which hydrates would otherwise form. Instead of using driers for this purpose, an antifreeze material, for instance brine or calcium chloride solution, to be circulated through the expansion valve would prevent difficulties due to the formation of hydrates.

From the driers the well fluids pass through heat exchanger 38 where they are cooled by indirect heat exchange with gases which have undergone expansion. They then pass through expansion valve 39 to separator 40, the pressure in which is controlled by means of pressure control valve 41. This separator operates at a pressure and temperature at which a large amount of distillate hydrocarbons can be recovered. Thus, for instance, it can be operated at a pressure of from 600 to 1400 pounds per square inch and at a temperature of from 0 to 75° F., preferably at a temperature in the lower part of that range. If, however, a suitable absorber oil is used higher pressures and temperatures will be found desirable but additional apparatus will, of course, be required.

The distillate from separator 40 passes out through valve 42 controlled by liquid level controller 43, into separator 44 which is operated at a lower pressure, for instance at a pressure of 200 pounds per square inch, this pressure being controlled by valve 45. From separator 44 the distillate passes through valve 46, controlled by liquid level controller 47, to a stabilization system not shown or it can alternatively be sent to another separator operating at atmospheric pressure.

Returning to separator 40 the gases pass through heat exchanger 38 where the low temperature is utilized to cool the stream passing to the separator and they are then ready for reinjection into the formation from which they came although it will be apparent that additional liquid hydrocarbons can be recovered by additional process steps if this is economically desirable. As shown, these gases pass through line 48, compressor 49 and valve 50 and thence through well II into formation A.

Similarly well fluids from formation B pass upwards from well II of Figure 1 and also from other wells exemplified by well IV of Figure 2 pass through valves 51 and 52, line 53 and cooler 54 and thence through valve 55 (valve 31 being closed) and line 56 into separator 32' which operates similarly to separator 32. In like fashion elements 33' to 43' correspond to elements 33 to 43 and have corresponding process functions. The distillate from separator 40' joins that from separator 40 in separator 44.

The gases from separator 40' in analogy with those from separator 40 are reinjected through line 48', compressor 49', line 57 and well I into formation B.

In the operation thus far described valves 58 in bypass line 59 are closed.

Returning to the distillate separated out in separators 32 and 32', this passes through line 60 to four-way valve 61 by which it can be directed through pressure reduction valve 62 and/or 62' to separator 40 and/or 40' or, less preferably, it can be directed through pressure reduction valve 63 directly to separator 44.

The gases from separator 44, being at a lower pressure than those from separators 40 and 40', have their pressure boosted by means of compressor 64 and can then be reinjected into either or both of formations A and B through either or both of wells I and II by opening one or both of valves 65 in line 66.

As thus described my invention contemplates separate distillate recovery systems for fluids from the two formations coupled with a single system for handling the distillate from the two formations. However, it will also be apparent that a single distillate recovery and reinjection system can be used for the fluids from both formations.

Formation B, being deeper than formation A, will normally be at a higher pressure. If it is desired to use a single distillate recovery system valve 55 is closed and valve 31 is opened and the pressure of the high pressure fluids is reduced to that of the low pressure fluids by means of pressure reduction valve 67. The two united fluid streams thence pass through separator 32, driers 36, heat exchanger 38 to separator 40. The gas from both formations, after separation of distillate in separator 40, passes through heat exchanger 38 to compressor 49. From this compressor a portion of the gas can be reinjected directly into formation A through well II and valve 50 while the remainder of it can be reinjected into formation B through well I by opening valves 58 and boosting the pressure to one in excess of the pressure in formation B by means of compressor 49'.

For this operation valves 33' and 42' are closed and distillate from separator 32 goes through line 60, valve 61 and valve 62 or 63 to separator 40 or 44.

My invention is applicable to producing formations at various depths and it is also applicable to more than two producing formations since additional strings of tubing can be used. However, it is particularly applicable to production from two relatively deep formations, for instance 5,000 feet or deeper, separated vertically from each other by at least 500 feet. Thus, for instance, producing formation A can be at a depth of 5,000 to 8,500 feet and producing formation B can be at a depth of 9,000 to 15,00 feet.

It is preferable, as above described, to use two concentric strings of tubing since this gives excellent heat exchange between the compressed injection gases and the upflowing well fluids, thus preventing precipitation of liquids with consequent uneven operation of the well due to formation of liquid slugs, but this advantage is retained to a considerable extent even if the two strings of tubing are not concentric.

It will also be apparent that while my invention has been described in connection with so-called distillate wells any type of producing operation from which liquid hydrocarbons are recovered and gas is reinjected can be handled in accordance with my invention and any type of liquid recovery system can be utilized.

Having thus described my invention in connection with specific embodiments thereof which are illustrative and not limitative, I hereby define my invention in the appended claims.

I claim:

1. A method of producing well fluids containing both normally gaseous and normally liquid hydrocarbons from at least two separate formations at different depths in the same field, recovering liquid hydrocarbons therefrom and reinjecting gases, comprising, producing well fluids from a first formation through a first well and from a second formation through a second well, recovering liquid hydrocarbons from the well fluids thus produced and injecting gas from which liquid hydrocarbons have thus been recovered into said first formation through said second well and into said second formation through said first well.

2. A method of producing well fluids from at least two separate formations at different depths in the same field, recovering liquid hydrocarbons therefrom and reinjecting gases, comprising, producing well fluids from one formation through a first well, recovering liquid hydrocarbons from the well fluids thus produced, injecting gas from which liquid hydrocarbons have thus been recovered into one of said formations through a second well, producing well fluids from a second formation through said second well, recovering liquid hydrocarbons from said last-mentioned well fluids, and reinjecting the gas from which said liquid hydrocarbons have thus been recovered into one of said formations through said first well.

3. A method according to claim 2 in which said two separate formations are at least 5,000 feet deep and are separated vertically from each other by at least 500 feet.

4. A method of producing well fluids, recovering liquid constituents and reinjecting gases; comprising producing well fluids from one formation through a first well, recovering liquid hydrocarbons from the well fluids thus produced, injecting gas from which liquid hydrocarbons have thus been recovered into said formation through a second well, producing well fluids from a second formation through said second well, recovering liquid hydrocarbons from said last-mentioned well fluids, and reinjecting the gas from which said liquid hydrocarbons have thus been recovered into said second formation through said first well.

5. A method of producing well fluids, recovering liquid constituents and reinjecting gases; comprising producing well fluids from one formation through one of two concentric strings of tubing in a first well, recovering liquid hydrocarbons from the well fluids thus produced, injecting gas from which liquid hydrocarbons have thus been recovered into said formation through one of two concentric strings of tubing in a second well, producing well fluids from a second formation through the other of said two concentric strings of tubing in said second well, recovering liquid hydrocarbons from the said last-mentioned well fluids, and reinjecting the gas from which said liquid hydrocarbons have thus been recovered into said second formation through the other of said two concentric strings of tubing in said first well.

6. A method of producing well fluids containing both normally gaseous and normally liquid hydrocarbons from at least two separate formations at different depths in the same field, recovering liquid hydrocarbons therefrom and reinjecting gases, comprising, producing well fluids from a first formation through a first well and from a second formation through a second well, commingling at least a part of the well fluids produced from said first formation with at least a part of the well fluids produced from said second formation, recovering liquid hydrocarbons from the commingled well fluids and injecting gas from which liquid hydrocarbons have thus been recovered into said first formation through said second well and into said second formation through said first well.

E. V. HEWITT.